(12) United States Patent
Hashimoto et al.

(10) Patent No.: US 11,691,639 B2
(45) Date of Patent: Jul. 4, 2023

(54) VEHICLE CONTROL SYSTEM, VEHICLE CONTROL DEVICE, AND CONTROL METHOD FOR A VEHICLE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 16/948,926

(22) Filed: Oct. 6, 2020

(65) Prior Publication Data

US 2021/0114608 A1    Apr. 22, 2021

(30) Foreign Application Priority Data

Oct. 18, 2019    (JP) .................................. 2019-191095

(51) Int. Cl.
  *B60W 50/06*    (2006.01)
  *F02D 41/28*    (2006.01)
  (Continued)

(52) U.S. Cl.
  CPC .......... *B60W 50/06* (2013.01); *B60W 50/045* (2013.01); *F02D 41/0002* (2013.01);
  (Continued)

(58) Field of Classification Search
  CPC .... B60W 50/06; B60W 50/045; G06N 20/00; F02D 41/0002; F02D 41/2462; F02D 41/28; G07C 5/02
  See application file for complete search history.

(56) References Cited

U.S. PATENT DOCUMENTS 5,410,477 A    4/1995    Ishii et al.
6,549,815 B1    4/2003    Kaji
(Continued)

FOREIGN PATENT DOCUMENTS

CN    105620388 A    6/2016
CN    107219797 A    9/2017
(Continued)

OTHER PUBLICATIONS

C. S. Arvind, et al., "Autonomous RL: Autonomous Vehicle Obstacle Avoidance in a Dynamic Environment using MLP-SARSA Reinforcement Learning," 2019 IEEE $5^{th}$ International Conference on Mechatronics System and Robots (ICMSR), 2019, pp. 120-124.

(Continued)

*Primary Examiner* — Peter D Nolan
*Assistant Examiner* — Mikko Okechukwu Obioha
(74) *Attorney, Agent, or Firm* — Oblon, McClelland, Maier & Neustadt, L.L.P.

(57) ABSTRACT

A vehicle control system includes a memory, a first processor mounted in a vehicle, and a second processor different from an in-vehicle device. The first processor and the second processor are configured to execute acquisition processing, operation processing, reward calculation processing, and update processing. The first processor is configured to execute at least the acquisition processing and the operation processing, and the second processor is configured to execute the update processing.

20 Claims, 6 Drawing Sheets

(51) Int. Cl.
   *F02D 41/24*    (2006.01)
   *F02D 41/00*    (2006.01)
   *G07C 5/02*     (2006.01)
   *G06N 20/00*    (2019.01)
   *B60W 50/04*    (2006.01)
   *G06Q 30/018*   (2023.01)

(52) U.S. Cl.
   CPC ......... *F02D 41/2464* (2013.01); *F02D 41/28* (2013.01); *G06N 20/00* (2019.01); *G07C 5/02* (2013.01); *B60W 2556/45* (2020.02); *F02D 2041/285* (2013.01); *G06Q 30/018* (2013.01)

(56) References Cited

U.S. PATENT DOCUMENTS

| | | | |
|---|---|---|---|
| 2006/0106536 A1* | 5/2006 | Park | G01C 21/32 340/995.14 |
| 2008/0208451 A1* | 8/2008 | Minami | G01C 21/32 701/533 |
| 2014/0277834 A1* | 9/2014 | Levien | B64C 39/024 701/2 |
| 2018/0088571 A1 | 3/2018 | Weinstein-Raun | |
| 2019/0102668 A1 | 4/2019 | Yao et al. | |
| 2020/0398859 A1* | 12/2020 | Borhan | F01N 3/2066 |
| 2022/0017106 A1* | 1/2022 | Ota | G05D 1/02 |
| 2022/0317993 A1* | 10/2022 | Taki | G06F 8/65 |

FOREIGN PATENT DOCUMENTS

| | | |
|---|---|---|
| CN | 110196587 A | 9/2019 |
| JP | 04-293626 A | 10/1992 |
| JP | 10-254505 A | 9/1998 |
| JP | 2000-250604 A | 9/2000 |
| JP | 2016-006327 A | 1/2016 |
| JP | 2019-144748 A | 8/2019 |
| WO | WO 2017/179172 A1 | 10/2017 |

OTHER PUBLICATIONS

Indian Office Action dated Dec. 2, 2021 in Indian Patent Application No. 202014043949, 5 pages.

Hu, Y., et al., "Energy Management Strategy for a Hybrid Electric Vehicle Based on Deep Reinforcement Learning", Applied Sciences, Jan. 26, 2018, vol. 8, No. 2, pp. 187 Whole document in particular. Figures 1, 4; pp. 4-8 (15 total pages).

* cited by examiner

|  | AREA 1 | AREA 2 |  |
|---|---|---|---|
| $0 < Lt \leq L1$ |  |  |  |
| $L1 < Lt \leq L2$ |  |  |  |
|  |  |  |  |

FIG. 6

VEHICLE CONTROL SYSTEM, VEHICLE CONTROL DEVICE, AND CONTROL METHOD FOR A VEHICLE

INCORPORATION BY REFERENCE

The disclosure of Japanese Patent Application No. 2019-191095 filed on Oct. 18, 2019 including the specification, drawings and abstract is incorporated herein by reference in its entirety.

BACKGROUND

1. Technical Field

The present disclosure relates to a vehicle control system, a vehicle control device, and a control method for a vehicle.

2. Description of Related Art

For example, Japanese Unexamined Patent Application Publication No. 2016-6327 (JP 2016-6327 A) describes a control device that operates a throttle valve as an operating unit of an internal combustion engine mounted in a vehicle based on a value obtained through filter processing on an operation amount of an accelerator pedal.

SUMMARY

Incidentally, since the filter needs to set an opening degree of the throttle valve of the internal combustion engine mounted in the vehicle to an appropriate opening degree according to the operation amount of the accelerator pedal, there is a need for an expert to apply many man-hours for adaptation. In this way, hitherto, an expert has applied many man-hours for adaptation of an operation amount or the like of electronic equipment in a vehicle according to a state of the vehicle.

A first aspect of the disclosure relates to a vehicle control system. The vehicle control system includes a memory, a first processor mounted in a vehicle, and a second processor different from an in-vehicle device. The memory is configured to store relationship definition data that defines a relationship between a state of a vehicle and an action variable, which is a variable relating to an operation of electronic equipment in the vehicle. The first processor and the second processor are configured to execute acquisition processing for acquiring a detection value of a sensor configured to detect the state of the vehicle, operation processing for operating the electronic equipment, reward calculation processing for providing, based on the detection value acquired through the acquisition processing, a greater reward when a characteristic of the vehicle satisfies a criterion than when the characteristic of the vehicle does not satisfy the criterion, and update processing for updating the relationship definition data with the state of the vehicle, a value of the action variable used for the operation of the electronic equipment, and the reward corresponding to the operation based on the detection value acquired through the acquisition processing as inputs to update mapping determined in advance. The first processor is configured to execute at least the acquisition processing and the operation processing. The second processor is configured to execute the update processing. The operation processing includes processing for operating the electronic equipment according to the relationship definition data updated through the update processing and the state of the vehicle. The second processor is configured to, based on the update mapping, output the relationship definition data updated to increase an expected return on the reward when the electronic equipment is operated in compliance with the relationship definition data. A plurality of the vehicles is provided. The update processing has the states of the vehicles, the values of the action variables of the vehicles, and the rewards of the vehicles as inputs to the update mapping.

In the above-described configuration, the reward accompanied by the operation of the electronic equipment is calculated, whereby it is possible to ascertain what kind of reward is obtained by the operation. Then, the relationship definition data is update based on the reward through update mapping compliant with reinforcement learning, whereby it is possible to set the relationship between the state of the vehicle and the action variable to an appropriate relationship in traveling of the vehicle. Accordingly, in setting the relationship between the state of the vehicle and the action variable to an appropriate relationship in traveling of the vehicle, it is possible to reduce man-hours requested to an expert.

In the above-described configuration, single relationship definition data is updated based on the states, the action variables, and the rewards on the vehicles, whereby it is possible to increase an update frequency compared to a case where single relationship definition data is updated based on the state, the action variable, and the reward of the single vehicle.

In the above-described aspect, the update processing may include processing for each of a plurality of groups, into which vehicles are classified, for updating the relationship definition data belonging to the same group to update the relationship definition data with the states of a plurality of vehicles belonging to the same group among the vehicles, the values of the action variables of the vehicles belonging to the same group, and the rewards of the vehicles belonging to the same group as inputs to the update mapping. The second processor may be configured to execute specification processing for specifying to which of the groups the states of the vehicles, the values of the action variables of the vehicles, and the rewards of the vehicles belong.

A set of a state of the vehicle and a value of an appropriate action variable may vary depending on a traveling environment of the vehicle, a degree of consumption of the vehicle, and a driving preference of a user, or the like. Accordingly, in the above-described configuration, the relationship definition data is updated for each group, whereby it is possible to update the relationship definition data to data more appropriate for each group based on the states of the vehicles, the action variables, and the rewards relating to all vehicles including the first processor in the system compared to a case where single relationship definition data is updated.

In the above-described aspect, the specification processing may include processing for specifying a belonging group according to positions of the vehicles. Since a current situation of a vehicle varies depending on an area, there is a possibility that the value of the action variable appropriate for the state of the vehicle varies depending on the area. Accordingly, in the above-described configuration, the group is specified based on a positional information variable, whereby it is possible to update the relationship definition data to data appropriate for each of a plurality of areas.

In the above-described aspect, the specification processing may include processing for specifying a belonging group according to degrees of consumption of the vehicles. Since the responsiveness of the vehicle to a user's operation varies depending on the degree of consumption of the vehicle, the value of the action variable appropriate for the state of the vehicle may vary according to the degree of consumption of the vehicle. Accordingly, in the above-described configuration, the group is specified based on the degree of consumption of the vehicle, whereby it is possible to update the relationship definition data to appropriate relationship definition data according to the degree of consumption of the vehicle.

In the above-described aspect, the operation processing may include exploration processing for executing an operation different from an operation to maximize the expected return ascertained from the relationship definition data. The second processor may be configured to execute instruction processing for issuing different values between a first vehicle and a second vehicle, which are two vehicles among the vehicles, as the value of the action variable to be executed as the exploration processing.

In the above-described configuration, the execution of different actions between the first vehicle and the second vehicle as exploration is instructed, whereby it is possible to control information obtained from exploration results of the vehicles.

A second aspect of the disclosure relates to a vehicle control device. The vehicle control device includes a memory configured to store relationship definition data that defines a relationship between a state of a vehicle and an action variable, which is a variable relating to an operation of electronic equipment in the vehicle, a first processor mounted in the vehicle and a second processor different from an in-vehicle device. The first processor and the second processor are configured to execute acquisition processing for acquiring a detection value of a sensor configured to detect the state of the vehicle, operation processing for operating the electronic equipment, reward calculation processing for providing, based on the detection value acquired through the acquisition processing, a greater reward when a characteristic of the vehicle satisfies a criterion than when the characteristic of the vehicle does not satisfy the criterion, and update processing for updating the relationship definition data with the state of the vehicle, a value of the action variable used for the operation of the electronic equipment, and the reward corresponding to the operation based on the detection value acquired through the acquisition processing as inputs to update mapping determined in advance. The first processor is configured to execute at least the acquisition processing and the operation processing, the second processor is configured to execute the update processing. The operation processing includes processing for operating the electronic equipment according to the relationship definition data updated through the update processing and the state of the vehicle. The second processor is configured to, based on the update mapping, output the relationship definition data updated to increase an expected return on the reward when the electronic equipment is operated in compliance with the relationship definition data and a plurality of the vehicles is provided, and the update processing has the states of the vehicles, the values of the action variables of the vehicles, and the rewards of the vehicles as inputs to the update mapping.

A third aspect of the disclosure relates to a control method for a vehicle. The control method for a vehicle including a memory configured to store relationship definition data that defines a relationship between a state of a vehicle and an action variable, which is a variable relating to an operation of electronic equipment in the vehicle, a first processor mounted in the vehicle and a second processor different from an in-vehicle device. The control method includes acquisition processing for acquiring by the first processor and the second processor, a detection value of a sensor configured to detect the state of the vehicle, operation processing for operating by the first processor and the second processor, the electronic equipment, reward calculation processing for providing by the first processor and the second processor, based on the detection value acquired through the acquisition processing, a greater reward when a characteristic of the vehicle satisfies a criterion than when the characteristic of the vehicle does not satisfy the criterion, and update processing for updating by the first processor and the second processor, the relationship definition data with the state of the vehicle, a value of the action variable used for the operation of the electronic equipment, and the reward corresponding to the operation based on the detection value acquired through the acquisition processing as inputs to update mapping determined in advance. The first processor is configured to execute at least the acquisition processing and the operation processing, the second processor is configured to execute the update processing. The operation processing includes processing for operating the electronic equipment according to the relationship definition data updated through the update processing and the state of the vehicle, the second processor is configured to, based on the update mapping, output the relationship definition data updated to increase an expected return on the reward when the electronic equipment is operated in compliance with the relationship definition data and a plurality of the vehicles is provided, and the update processing has the states of the vehicles, the values of the action variables of the vehicles, and the rewards of the vehicles as inputs to the update mapping.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

A portion (a) and a portion (b) in FIG. 3 are flowcharts showing a procedure of processing that is executed by the system according to the first embodiment.

A portion (a) and a portion (b) in FIG. 5 are flowcharts showing a procedure of processing that is executed by a system according to a second embodiment.

DETAILED DESCRIPTION OF EMBODIMENTS

First Embodiment

Figure 1:
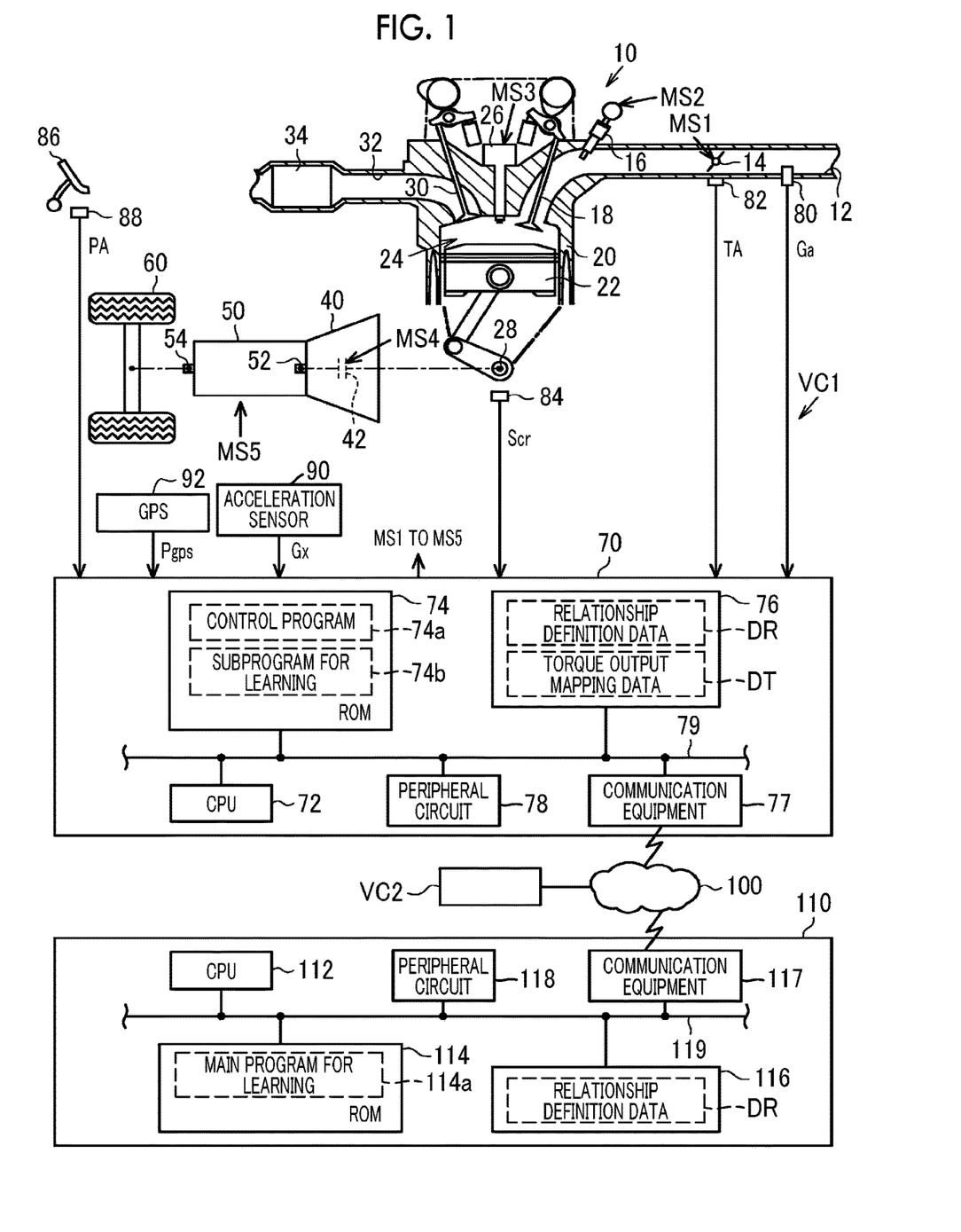
FIG. 1 is a diagram showing the configuration of a vehicle control system according to a first embodiment.

Hereinafter, a first embodiment of a vehicle control system will be described referring to the drawings. FIG. 1 shows the configuration of a drive system and a control system of a vehicle VC1 according to the embodiment.

As shown in FIG. 1, in an intake passage 12 of an internal combustion engine 10, a throttle valve 14 and a fuel injection valve 16 are provided in order from an upstream side, and air sucked into the intake passage 12 or fuel injected from the fuel injection valve 16 flows into a combustion chamber 24 partitioned by a cylinder 20 and a piston 22 when an intake valve 18 is opened. In the combustion chamber 24, an air-fuel mixture of fuel and air is supplied for combustion with spark discharge of an ignition device 26, and energy generated by combustion is converted into rotational energy of a crankshaft 28 through the piston 22. The air-fuel mixture supplied for combustion is discharged as exhaust gas to an exhaust passage 32 when an exhaust valve 30 is opened. In the exhaust passage 32, a catalyst 34 as a post-processing device that removes exhaust gas.

An input shaft 52 of a transmission 50 is mechanically coupled to the crankshaft 28 through a torque converter 40 including a lockup clutch 42. The transmission 50 is a device that varies a gear ratio as a ratio of a rotation speed of the input shaft 52 and a rotation speed of an output shaft 54. Drive wheels 60 are mechanically coupled to the output shaft 54.

A control device 70 adapts the internal combustion engine 10 as a control target and operates an operating unit of the internal combustion engine 10, such as the throttle valve 14, the fuel injection valve 16, or the ignition device 26, to control torque, an exhaust gas component ratio, or the like that is a control amount of the internal combustion engine. The control device 70 also adapts the torque converter 40 as a control target and operates the lockup clutch 42 to control an engagement state of the lockup clutch 42. The control device 70 also adapts the transmission 50 as a control target and operates the transmission 50 to control the gear ratio as a control amount of the transmission. In FIG. 1, respective operation signals MS1 to MS5 of the throttle valve 14, the fuel injection valve 16, the ignition device 26, the lockup clutch 42, and the transmission 50 are described.

The control device 70 refers to an intake air amount Ga detected by an air flowmeter 80, an opening degree (throttle valve opening degree TA) of the throttle valve 14 detected by a throttle sensor 82, and an output signal Scr of a crank angle sensor 84 to control the control amount. The control device 70 also refers to a depression amount (accelerator operation amount PA) of an accelerator pedal 86 detected by an accelerator sensor 88 and a lateral acceleration Gx of the vehicle VC1 detected by an acceleration sensor 90. The control device 70 also refers to position data Pgps from a global positioning system (GPS 92).

The control device 70 includes a CPU 72, a ROM 74, an electrically rewritable nonvolatile memory (memory 76), communication equipment 77, and a peripheral circuit 78, and the units are communicable through a local network 79. Here, the peripheral circuit 78 includes a circuit that generates a clock signal for defining an internal operation, a power supply circuit, a reset circuit, and the like.

The ROM 74 stores a control program 74a and a subprogram 74b for learning. On the other hand, the memory 76 stores relationship definition data DR that defines a relationship between the accelerator operation amount PA, and a command value (throttle valve opening degree command value TA*) of the throttle valve opening degree TA and a retardation amount aop of the ignition device 26. Here, the retardation amount aop is a retardation amount with respect to a reference ignition timing determined in advance, and the reference ignition timing is a timing on a retardation side out of an MBT ignition timing and a knock limit point. The MBT ignition timing is an ignition timing (maximum torque ignition timing) at which maximum torque is obtained. The knock limit point is an advancement limit value of an ignition timing at which knocking can be restrained within an allowable level under assumed best conditions when high-octane-number fuel having a high lick limit is used. The memory 76 stores torque output mapping data DT. Torque output mapping defined by the torque output mapping data DT is mapping for outputting torque Trq with a rotation speed NE of the crankshaft 28, filling efficiency $\eta$, and an ignition timing as inputs.

The communication equipment 77 is equipment for communication with a data analysis center 110 through an external network 100 of the vehicle VC1. The data analysis center 110 analyzes data transmitted from a plurality of vehicles VC1, VC2, The data analysis center 110 comprises a CPU 112, a ROM 114, an electrically rewritable nonvolatile memory (memory 116), a peripheral circuit 118, and communication equipment 117, and the units are communicable through a local network 119. The ROM 114 stores a main program 114a for learning for updating the relationship definition data DR through reinforcement learning. The memory 116 stores the relationship definition data DR.

Figure 2:
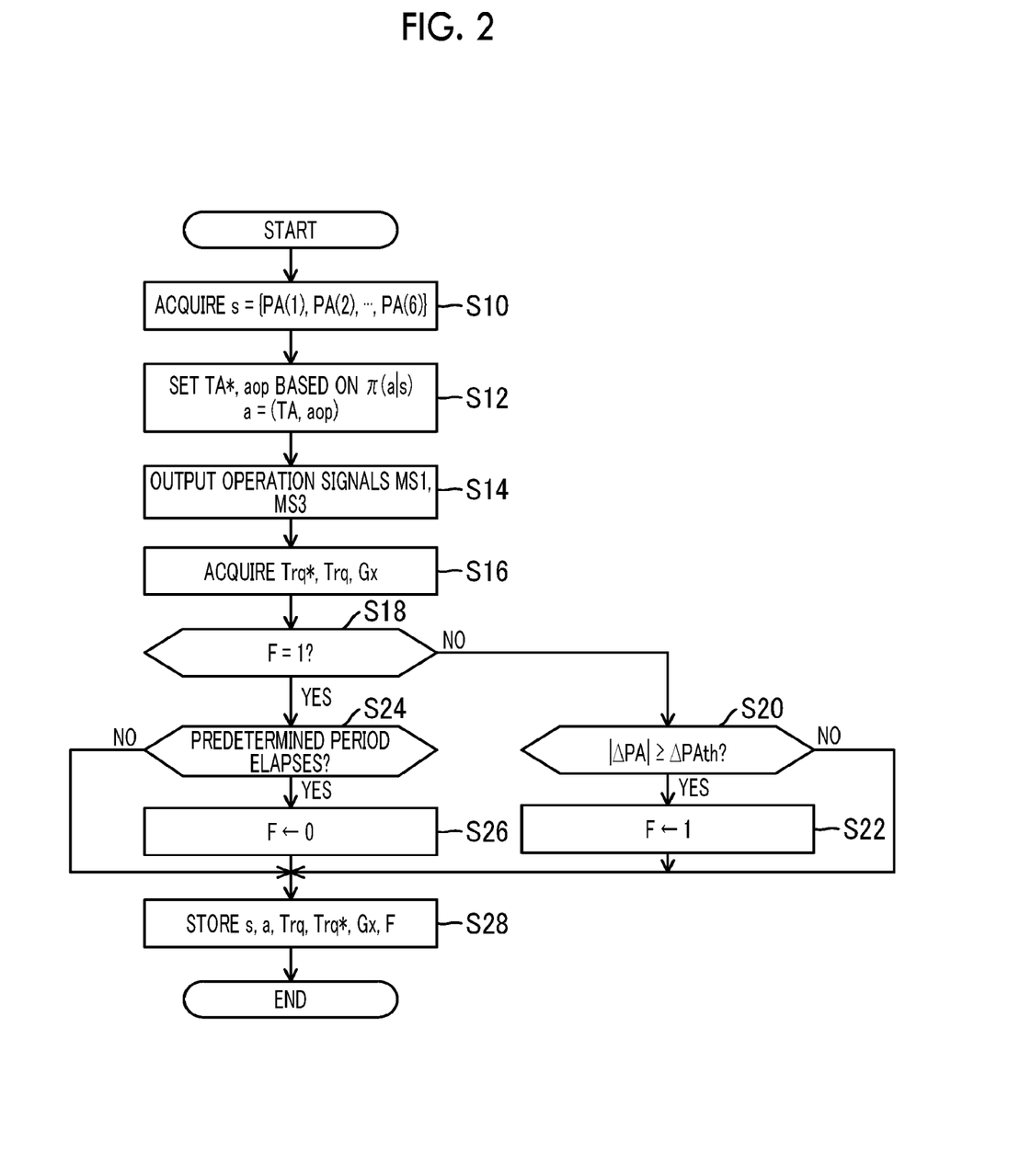
FIG. 2 is a flowchart showing a procedure of processing that is executed by a control device according to the first embodiment.

FIG. 2 shows a procedure of processing that is executed by the control device 70 according to the embodiment. The processing shown in FIG. 2 is implemented by the CPU 72 repeatedly executing the control program 74a stored in the ROM 74, for example, in a predetermined cycle. In the following description, the step number of the respective processing is represented by a number in front of which the character "S" is given.

In a series of processing shown in FIG. 2, the CPU 72 first acquires time-series data including six sampling values "PA(1), PA(2), PA(6)" of the accelerator operation amount PA as a state s (S10). Here, the sampling values constituting time-series data are sampled at different timings from one another. In the embodiment, time-series data is constituted of six sampling values adjacent to one another in time series when sampling is performed in a given sampling cycle.

Next, the CPU 72 sets an action a including the throttle valve opening degree command value TA* and the retardation amount aop according to the state s acquired through the processing of S10 in compliance with a policy $\pi$ determined by the relationship definition data DR (S12).

In the embodiment, the relationship definition data DR is data that determines an action value function Q and the policy $\pi$. In the embodiment, the action value function Q is a function in a table format indicating a value of an expected return according to eight-dimensional independent variables of the state s and the action a. The policy $\pi$ determines a rule to select an action a (greedy action) maximizing the action value function Q with the independent variable to be the given state s with priority and also to select another action a with a predetermined probability c when the state s is given.

Next, the CPU 72 outputs the operation signal MS1 to the throttle valve 14 to operate the throttle valve opening degree TA and outputs the operation signal MS3 to the ignition device 26 to operate the ignition timing based on the set throttle valve opening degree command value TA* and retardation amount aop (S14). Here, in the embodiment, since feedback control of the throttle valve opening degree TA to the throttle valve opening degree command value TA* is illustrated, even though the throttle valve opening degree command value TA* is the same value, the operation signal MS1 may be different. For example, when known knocking control (KCS) or the like is performed, the ignition timing becomes a value resulting from feedback correction by the KCS on a value obtained by retarding the reference ignition timing by the retardation amount aop. Here, the reference ignition timing is set variably according to the rotation speed NE of the crankshaft 28 and the filling efficiency η by the CPU 72. The rotation speed NE is calculated based on the output signal Scr of the crank angle sensor 84 by the CPU 72. The filling efficiency η is calculated based on the rotation speed NE and the intake air amount Ga by the CPU 72.

Next, the CPU 72 acquires the torque Trq of the internal combustion engine 10, a torque command value Trq* to the internal combustion engine 10, and the acceleration Gx (S16). Here, the CPU 112 calculates the torque Trq by inputting the rotation speed NE, the filling efficiency 11, and the ignition timing to torque output mapping. The CPU 72 sets the torque command value Trq* according to the accelerator operation amount PA.

Next, the CPU 72 determines whether or not a transition flag F is "1" (S18). When the transition flag F is "1", this indicates that the internal combustion engine is in a transition operation, and when the transition flag F is "0", this indicates that the internal combustion engine is not in the transition operation. When determination is made that the transition flag F is "0" (S18: NO), the CPU 72 determines whether or not an absolute value of a change amount ΔPA per unit time of the accelerator operation amount PA is equal to or greater than a predetermined amount ΔPAth (S20). Here, the change amount ΔPA should be set to, for example, the difference between the latest accelerator operation amount PA at an execution timing of the processing of S20 and the accelerator operation amount PA before the same timing by the unit time.

When determination is made that the absolute value of the change amount ΔPA is equal to or greater than the predetermined amount ΔPAth (S20: YES), the CPU 72 substitutes "1" into the transition flag F (S22). In contrast, when determination is made that the transition flag F is "1" (S18: YES), after the execution of the processing of S22, the CPU 72 determines whether or not a predetermined period has elapsed (S24). Here, the predetermined period is set to a period until a state in which the absolute value of the change amount ΔPA per unit time of the accelerator operation amount PA becomes equal to or less than a specified amount smaller than the predetermined amount ΔPAth is continued for a predetermined time. In a case where determination is made that the predetermined period has elapsed (S24: YES), the CPU 72 substitutes "0" into the transition flag F (S26).

When the processing of S22 or S26 is completed or when negative determination is made in the processing of S20 or S24, the CPU 72 progresses to processing of S28. In the processing of S28, the CPU 72 stores the state s acquired in the processing of S10, the action a selected in the processing of S12, the torque Trq, the torque command value Trq*, and the acceleration Gx acquired in the processing of S16, and the value of the transition flag F in the memory 76.

Figure 3:
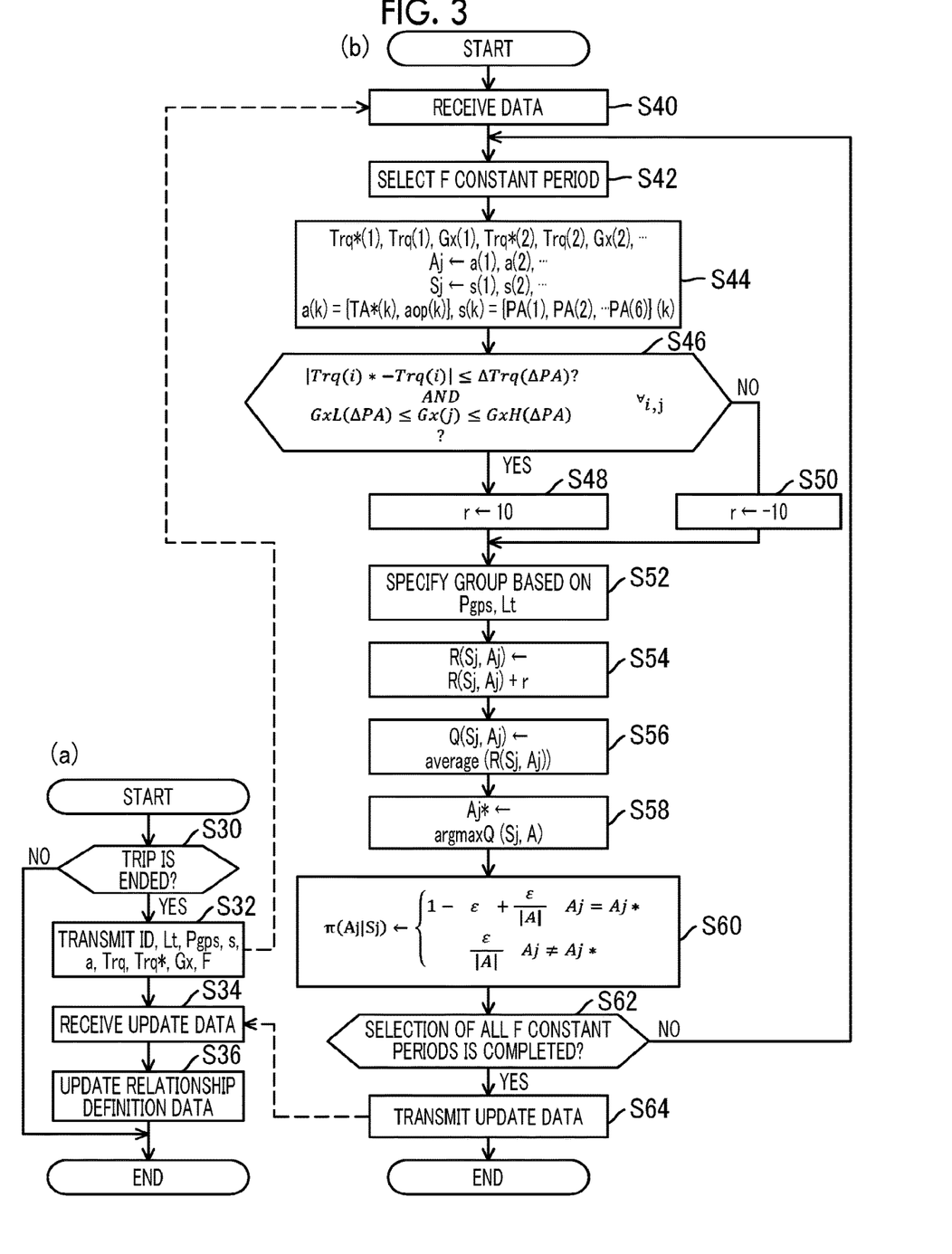

When the processing of S28 is completed, the CPU 72 ends a series of processing shown in FIG. 2 once. FIG. 3 shows a processing procedure of reinforcement learning according to the embodiment. Processing shown in the portion (a) of FIG. 3 is implemented by the CPU 72 executing the subprogram 74b for learning stored in the ROM 74 shown in FIG. 1. Processing in the portion (b) of FIG. 3 is implemented by the CPU 112 executing the main program 114a for learning stored in the ROM 114. In the following description, the processing shown in FIG. 3 will be described in time series.

In a series of processing shown in the portion (a) of FIG. 3, the CPU 72 first determines whether or not a trip is ended (S30). Here, the trip is a single period during which a traveling permission signal of a vehicle is in an on state. In the embodiment, the traveling permission signal corresponds to an ignition signal.

When determination is made that the trip is ended (S30: YES), the CPU 72 operates the communication equipment 77 to transmits an identification information ID of the vehicle VC1, a traveling distance Lt, position data Pgps, and data stored through the processing of S28 (S32).

In contrast, as shown in the portion (b) of FIG. 3, the CPU 112 receives data transmitted through the processing of S32 (S40). Then, the CPU 112 selects one period during which the transition flag F in the received data is constant, that is, one episode (S42). Each episode is a period from when the processing of S26 is executed until the processing of S22 is executed or a period from when the processing of S22 is executed until the processing of S26 is executed.

Next, the CPU 112 acquires time-series data including a set of three sampling values of the torque command value Trq*, the torque Trq, and the acceleration Gx in the selected episode and time-series data of the state s and the action a (S44). FIG. 3 shows that different numbers in parentheses are values of variables at different sampling timings. For example, a torque command value Trq*(1) and a torque command value Trq*(2) are different in sampling timing from each other. Time-series data of the action a belonging to the selected episode is defined as an action set Aj, and time-series data of the state s belonging to the same episode is defined as a state set Sj.

Next, the CPU 112 determines whether or not a logical product of a condition (A) that an absolute value of the difference between any torque Trq and the torque command value Trq* belonging to the selected episode is equal to or less than a specified amount ΔTrq and a condition (B) that the acceleration Gx is equal to or greater than a lower limit value GxL and equal to or less than an upper limit value GxH is true (S46).

Here, the CPU 112 variably sets the specified amount ΔTrq with the change amount ΔPA per unit time of the accelerator operation amount PA at the time of a start of an episode. That is, the CPU 112 determines that an episode relates to a transition period when the absolute value of the change amount ΔPA of the accelerator operation amount PA is large at the time of a start of an episode, and sets the specified amount ΔTrq to a greater value than an episode relating to a normal period.

The CPU 112 variably sets the low limit value GxL with the change amount ΔPA of the accelerator operation amount PA at the time of the start of the episode. That is, when the episode relates to the transition period and the change amount ΔPA is positive, the CPU 112 sets the lower limit value GxL to a greater value than the episode in the normal period. When the episode relates to the transition period and the change amount ΔPA is negative, the CPU 112 sets the lower limit value GxL to a smaller value than the episode in the normal period.

The CPU 112 variably sets the upper limit value GxH with the change amount ΔPA per unit time of the accelerator operation amount PA at the time of the start of the episode. That is, when the episode relates to the transition period and the change amount ΔPA is positive, the CPU 112 sets the upper limit value GxH to a greater value than the episode in the normal period. When the episode relates to the transition period and the change amount ΔPA is negative, the CPU 112 sets the upper limit value GxH to a smaller value than the episode in the normal period.

When determination is made that the logical produce is true (S46: YES), the CPU 112 substitutes "10" into a reward r (S48), and when determination is made that the logical product is false (S46: NO), the CPU 112 substitutes "−10" into the reward r (S50). When the processing of S48 or S50 is completed, the CPU 72 specifies a group, to which a vehicle as a transmission source of data received through the processing of S40 belongs, to update the relationship definition data DR for each of groups into which the vehicles VC1, VC2, . . . are classified (S52).

Figure 4:
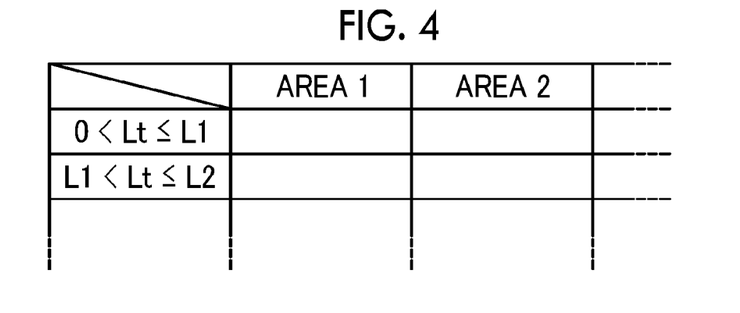
FIG. 4 is a diagram illustrating classification of vehicles according to the first embodiment.

FIG. 4 illustrates classification of vehicles in the embodiment. In the embodiment, a group is specified by an area where a vehicle is positioned and the traveling distance Lt. For example, a vehicle that is positioned in an area 1 and a vehicle that is positioned in an area 2 belong to different groups to each other. Here, in the classification by area, for example, the area 1 should be North America, and the area 2 should be South America or the like. The classification by area is provided in view of the consideration that an optimum action a for the state s may be different because a fuel property or an environment is different for each area. Even though vehicles belong to the same area, a vehicle having the traveling distance Lt equal to or less than "L1" greater than "0" and a vehicle having the traveling distance Lt equal to or greater than "L1" and equal to or less than "L2" belong to different groups. The classification by traveling distance Lt is provided in view of the consideration that an optimum action a for the state s may be different because, for example, the responsiveness of a vehicle to a driving operation of the user may be different depending on the degree of consumption of the vehicle.

The CPU 72 specifies an area with the position data Pgps and specifies a group with the specified area and the traveling distance Lt. Then, the CPU 72 updates the relationship definition data DR common to the specified group. In the embodiment, an ε-soft on-policy type Monte Carlo method is used.

That is, the CPU 112 adds the reward r to each return R(Sj,Aj) determined by a set of each state read through the processing of S44 and an action corresponding to each state (S54). Here, "R(Sj,Aj)" comprehensively represents a return R with one of the elements of the state set Sj as a state and one of the elements of the action set Aj as an action. Next, the return R(Sj,Aj) determined by the set of each state read through the processing of S44 and the corresponding action is averaged, and the averaged reward is substituted into the corresponding action value function Q(Sj,Aj) (S56). Here, averaging should be processing for dividing the return R calculated through the processing of S54 by a value obtained by adding a predetermined number to the number of times in which the processing of S54 is executed. An initial value of the return R should be an initial value of the corresponding action value function Q.

Next, the CPU 112 substitutes, into an action Aj*, an action that is a set of the throttle valve opening degree command value TA* and the retardation amount aop when the corresponding action value function Q(Sj,A) has a maximum value on each state read through the processing of S44 (S58). Here, "A" indicates any possible action. Although the action Aj* becomes an individual value according to the type of the state read through the processing of S44, here, the action Aj* is simplified in expression and described by the same symbol.

Next, the CPU 112 updates a corresponding policy R(Aj|Sj) on each state read through the processing of S44 (S60). That is, in a case where the total number of actions is "|A|", a selection probability of the action Aj* selected through S58 is "1−ε+ε/|A|". A selection probability of each of "|A|−1" actions other than the action Aj* is "ε/|A|". Since the processing of S60 is processing based on the action value function Q updated through the processing of S56, with this, the relationship definition data DR that defines the relationship between the state s and the action a is updated so as to increase the return R.

Next, the CPU 112 determines whether or not the processing of S44 to S60 is completed on all episodes belonging to data for one trip received through the processing of S40 (S62). Then, when determination is made that there is an episode that is not yet completed (S62: NO), the CPU 112 returns to the processing of S42.

In contrast, when determination is made that the processing of S44 to S60 is completed on all episodes (S62: YES), the CPU 112 operates the communication equipment 117 to transmit the updated relationship definition data DR to a transmission source of data received through the processing of S40 (S64). When the processing of S64 is completed, the CPU 112 ends a series of processing shown in the portion (b) of FIG. 3 once.

In contrast, as shown in the portion (a) of FIG. 3, the CPU 72 receives the updated relationship definition data DR (S34), and rewrites the relationship definition data DR for use in the processing of S12 with the received relationship definition data DR (S36). When the processing of S36 is completed or when negative determination is made in the processing of S30, the CPU 72 ends a series of processing shown in the portion (a) of FIG. 3 once.

The relationship definition data DR stored in the memory 76 at the time of shipment of the vehicle VC1 is a learned model in which reinforcement learning is performed to a certain level through the processing based on FIGS. 2, 3 while a simulation of traveling of the vehicle is performed by a test bench or the like. Note that, in regards to the independent variables of the action value function Q for reinforcement learning, a part of all combinations of possible values of the state s and the action a is reduced by human knowledge or the like in learning before shipment. That is, for example, determination is made that a situation in which one of adjacent two sampling values in the time-series data of the accelerator operation amount PA becomes a minimum value of the accelerator operation amount PA and the other sampling value becomes a maximum value does not result from a human operation on the accelerator pedal 86, and the action value function Q is not defined solely in learning before shipment. In the embodiment, with the dimension reduction based on the human knowledge or the like, the possible values of the state s defining the action value function Q are limited to be equal to or less than the fourth power of 10, and more desirably, equal to or less than the third power of 10 solely in learning before shipment.

Here, the operation and the effects of the embodiment will be described. The CPU 72 acquires the time-series data of the accelerator operation amount PA as the state s with a user's operation on the accelerator pedal 86 and sets the action a including the throttle valve opening degree command value TA* and the retardation amount aop in compliance with the policy π. Here, the CPU 72 basically selects the action a maximizing the expected return based on the action value function Q defined in the relationship definition data DR. Note that the CPU 72 explores the action a maximizing the expected return by selecting an action other than the action a maximizing the expected return with the predetermined probability e. Then, the CPU 72 transmits the state s, the action a, the torque Trq, the torque command value Trq*, and the acceleration Gx to the data analysis center HO.

With this, the data analysis center 110 can update the relationship definition data DR through reinforcement learning with user's driving of the vehicle VC1. Accordingly, the throttle valve opening degree command value TA* and the retardation amount aop according to the accelerator operation amount PA can be set to appropriate values in traveling of the vehicle VC1 while man-hours of the expert are not excessively increased. In particular, since single relationship definition data DR is updated based on data transmitted from a plurality of vehicles, the data analysis center 110 can increase an update frequency of the relationship definition data DR compared to a case where single relationship definition data DR is updated based on data transmitted from one vehicle. This means that the number of times of exploration for updating the relationship definition data DR can be increased in a short time.

That is, while a probability that each of the actions other than the greedy action is selected in each state is "$\varepsilon/|A|$", until an action other than the greedy action is sufficiently evaluated in each state, the action needs to be selected a certain number of times. This means that the number of occurrences of each state s needs to be increased. Here, a total frequency that a specific state s occurs in one million vehicles becomes about one million times the frequency that the specific state s occurs in one vehicle. For this reason, when data from one million vehicles is used, a time needed until the state s occurs the requested number of times in sufficiently evaluating the action selected by exploration becomes about one millionth of a needed time when data of solely one vehicle is used. Accordingly, an appropriate action a can be quickly found when various users drive the vehicles.

According to the embodiment described above, the following effects are further obtained. The data analysis center 110 updates individual relationship definition data DR for each piece of data of grouped vehicles instead of updating single relationship definition data DR using data of all vehicles. With this, for example, even though the relationship definition data DR common to all vehicles is mounted at the time of shipments of the vehicles, the relationship definition data can be updated to data more appropriate for each group.

In a state in which learning through reinforcement learning is performed solely on a part of the values of the independent variables of the action value function Q before shipment, the action value function Q can be learned on the values of all independent variables with driving of the vehicle VC1 after shipment. With this, the action value function Q can be learned based on enormous data transmitted from the vehicles VC1, VC2, . . . , through reinforcement learning having independent variables of greater dimensionality as learning is harder before product shipment.

The time-series data of the accelerator operation amount PA is included in the independent variables of the action value function Q. With this, the value of the action a can be finely adjusted for various changes in accelerator operation amount PA compared to when solely a single sampling value related to the accelerator operation amount PA is used as an independent variable.

The throttle valve opening degree command value TA* itself is included in the independent variables of the action value function Q. With this, for example, the degree of freedom of exploration through reinforcement learning is easily increased compared to when a parameter or the like of a model expression modeling the behavior of the throttle valve opening degree command value TA* is used as an independent variable relating to the throttle valve opening degree.

Second Embodiment

Hereinafter, a second embodiment will be described referring to the drawings focusing differences from the first embodiment.

In the embodiment, the probability c that an action other than the greedy action is taken is gradually decreased to zero with time, such that solely the greedy action is selected when a certain amount of time elapses after shipment of the vehicle. In the embodiment, classification by traveling distance Lt is performed in solely one stage, and re-exploration is temporarily executed in a group where the traveling distance Lt becomes large to a certain level.

Figure 5:
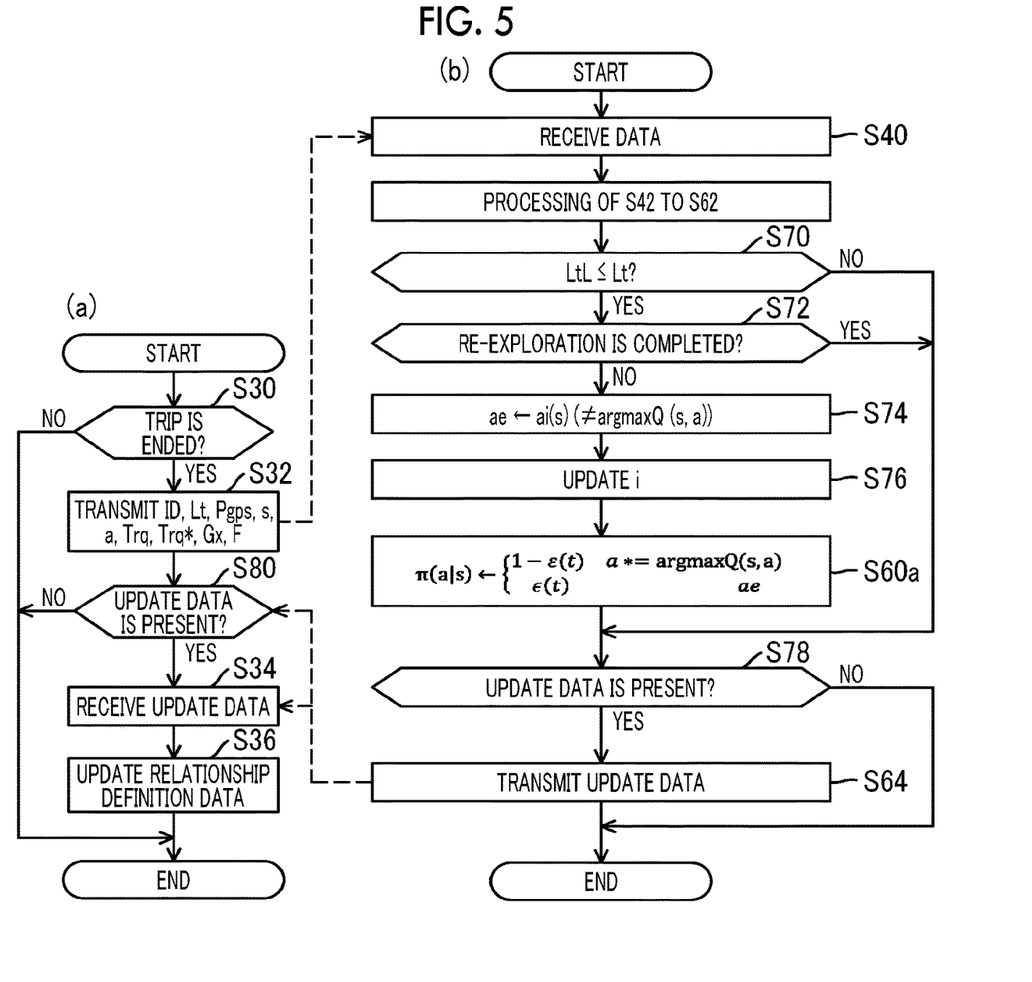

FIG. 5 shows a processing procedure of reinforcement learning according to the embodiment. Processing shown in the portion (a) of FIG. 5 is implemented by the CPU 72 executing the subprogram 74b for learning stored in the ROM 74 shown in FIG. 1. Processing shown in the portion (b) of FIG. 5 is implemented by the CPU 112 executing the main program 114a for learning stored in the ROM 114. In the following description, processing corresponding to the processing shown in FIG. 3 is represented by the same step numbers for convenience. In the following description, the processing shown in FIG. 5 will be described in time series.

As shown in the portion (b) of FIG. 5, the CPU 112 executes the processing of S40 to S62. Next, the CPU 112 determines whether or not the traveling distance Lt is equal to or greater than a consumption lower limit value LtL (S70). Here, the consumption lower limit value LtL is a value that determines a threshold value of classification by traveling distance Lt. The consumption lower limit value LtL is set to a value at which the probability c that an action other than the greedy action is selected is assumed to be zero.

When determination is made that the traveling distance Lt is equal to or greater than the consumption lower limit value LtL (S70: YES), the CPU 112 determines whether or not re-exploration is completed in a group of vehicles having the traveling distance Lt equal to or greater than the consumption lower limit value LtL (S72). Here, the completion of re-exploration means that the probability c that an action other than the greedy action is selected becomes zero through processing of S60a described below. When determination is made that re-exploration is not yet completed (S72: NO), the CPU 112 substitutes one action ai other than the greedy action into an exploration action ae (S74). Next, the CPU 112 updates a label variable i of the action other than the greedy action (S76). Then, the CPU 72 updates the relationship definition data DR for a group having the traveling distance Lt equal to or greater than the consumption lower limit value LtL (S60a). Here, a probability that the greedy action is selected is "$1-\varepsilon$", a probability that the exploration action ae is selected is "$\varepsilon$", and a probability that other actions are selected is "0".

Then, when the processing of S60a is completed, when negative determination is made in the processing of S70, or when affirmative determination is made in the processing of S72, the CPU 112 determines whether or not the relationship definition data DR is updated (S78). Here, even though affirmative determination is made in the processing of S72, when the relationship definition data DR for the group having the traveling distance Lt equal to or greater than the consumption lower limit value LtL is not transmitted to the vehicle as a transmission source of data received through the processing of S40, the CPU 112 determines that updated data is present. Then, when determination is made that updated data is present (S78: YES), the CPU 72 operates the communication equipment 117 to transmit the relationship definition data DR to the vehicle as a transmission source of data received through the processing of S40 (S64).

When the processing of S64 is completed or when negative determination is made in the processing of S78, the CPU 112 ends a series of processing shown in the portion (b) of FIG. 5 once. In contrast, as shown in the portion (a) of FIG. 5, the CPU 72 determines whether or not updated data is present (S80). Then, when determination is made that updated data is present (S80: YES), the CPU 72 progresses to the processing of S34. When the processing of S36 is completed or when negative determination is made in the processing of S30 or S80, the CPU 72 ends a series of processing shown in the portion (a) of FIG. 5 once.

Here, the operation and the effects of the embodiment will be described. The CPU 72 acquires the time-series data of the accelerator operation amount PA according to a user's operation on the accelerator pedal 86 and sets the action a including the throttle valve opening degree command value TA* and the retardation amount aop in compliance with the policy π. Here, the CPU 72 basically selects the action a maximizing the expected return based on the action value function Q defined in the relationship definition data DR. Note that the CPU 72 explores the action a maximizing the expected return by selecting an action other than the action a maximizing the expected return with the predetermined probability ε. With this, the relationship definition data DR can be updated through reinforcement learning with user's driving of the vehicle VC1. With this, the throttle valve opening degree command value TA* and the retardation amount aop according to the accelerator operation amount PA can be set to appropriate values in traveling of the vehicle VC1 while man-hours of the expert are not excessively increased.

Here, since the probability ε is gradually decreased to zero with time, when learning is performed to a certain level, determination is made that the relationship definition data DR is appropriate for actual traveling, and solely the greedy action can be selected. With this, the optimum throttle valve opening degree command value TA* and retardation amount aop are constantly set.

Note that, when the traveling distance Lt of the vehicle becomes large, there is a concern that the relationship definition data DR is not optimum data due to the consumption of the vehicle. For example, when deposits are deposited in the throttle valve 14 or the intake passage 12, since a flow passage cross-sectional area of the intake passage 12 becomes small, the intake air amount Ga becomes small even though the throttle valve opening degree TA is the same. For this reason, it is desirable that the throttle valve opening degree command value TA* maximizing the expected return according to the time-series data of the accelerator operation amount PA defined in the relationship definition data DR becomes a value compensating for the reduction of the flow passage cross-sectional area of the intake passage 12 due to deposition of deposits on the throttle valve 14.

Accordingly, in the embodiment, re-exploration is executed on a vehicle considered that the traveling distance Lt becomes large to a certain level and the consumption of the vehicle is in progress. With this, after product shipment, as the traveling distances Lt of several vehicles become equal to or greater than the consumption lower limit value LtL, the relationship definition data DR appropriate for the consumed vehicles can be learned through reinforcement learning.

Figure 6:
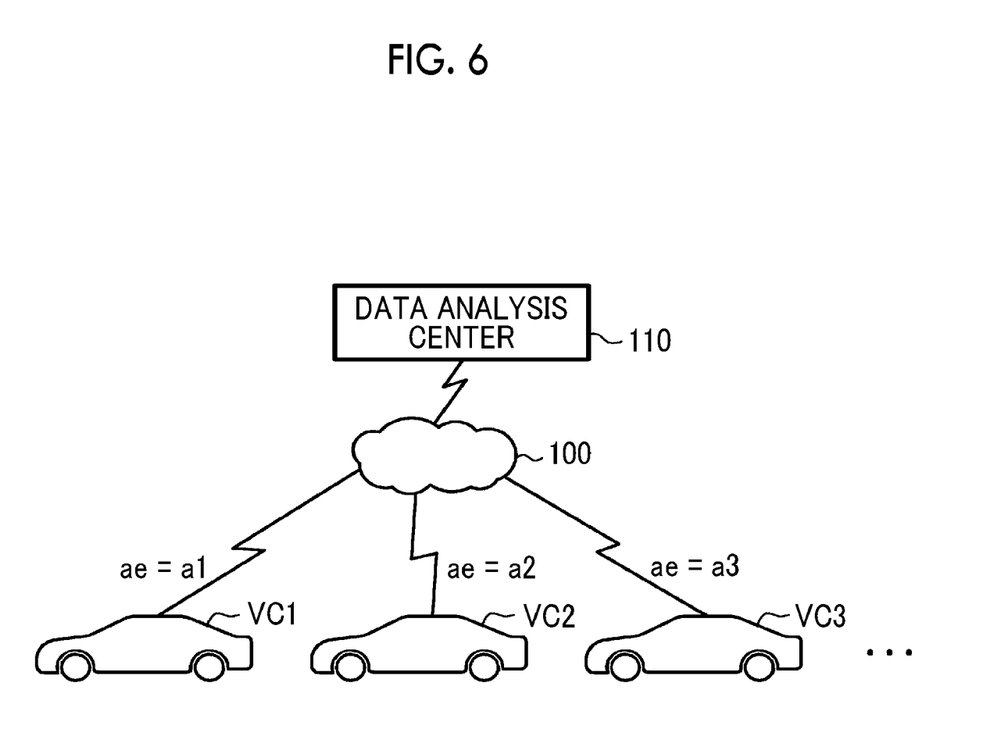
FIG. 6 is a diagram illustrating setting of an action for re-exploration according to the second embodiment.

According to the embodiment described above, the following effects are further obtained. During re-exploration processing, the CPU 112 changes the exploration action ae each time the relationship definition data DR is transmitted. With this, as shown in FIG. 6, an action a1 is employed as the exploration action ae in the vehicle VC1, an action a2 is selected as the exploration action in the vehicle VC2, and an action a3 is selected as the exploration action ae in the vehicle VC3. With this, an action other than the greedy action can be tested early a predetermined number of times compared to when a vehicle that executes re-exploration selects the action a at random.

Correspondence Relationship

The correspondence relationship between the matters in the above-described embodiments and the disclosure is as follows. In the disclosure, electronic equipment corresponds to the throttle valve 14 or the ignition device 26. A first processor corresponds to the CPU 72 and the ROM 74, and a second processor corresponds to the CPU 112 and the ROM 114. A memory corresponds to the memory 76 or 116. Acquisition processing corresponds to the processing of S10, S16. Operation processing corresponds to the processing of S14. Reward calculation processing corresponds to the processing of S46 to S50. Update processing corresponds to the processing of S54 to S60. Update mapping corresponds to mapping defined by the processing of S54 to S60 determined by the main program 114a for learning. In the disclosure, specification processing corresponds to the processing of S52. In the disclosure, a degree of consumption is quantified by the traveling distance Lt. In the disclosure, exploration processing corresponds to the processing of S12, S14 when the greedy action is not taken. Instruction processing corresponds to the processing of S74, S76, S60a, S64.

Other Embodiments

The embodiment can be modified as follows. The embodiment and the following modification examples can be combined as long as no technical contradiction arises.

Variable Indicating Degree of Consumption

In the above-described embodiments, although the traveling distance Lt is exemplified as the variable indicating the degree of consumption of the vehicle, the disclosure is not limited thereto. For example, an average value of the intake air amount Ga per percent of the opening degree of the throttle valve 14 may be used. For example, as described in a column "Vehicle" described below, in a case of a vehicle including a rotating electric machine as a thrust generation device of a vehicle, a fully charged electric charge amount of a battery that supplies electric power to the rotating electric machine may be used.

Classification of Vehicles

In the above-described embodiments, a plurality of vehicles is divided into a plurality of groups according to the degree of consumption of the vehicle and the area, the disclosure is not limited thereto. For example, the vehicles may be classified according to solely one of the two elements of the degree of consumption of the vehicle and the area.

As the variable for specifying a group, for example, a maximum value or an average value of the accelerator operation amount PA may be used. With this, classification according to a driving preference of the user can be performed. The classification of the vehicles is not limited as being defined in advance from a predetermined viewpoint. For example, a plurality of groups may be automatically generated through unsupervised learning by clustering information obtained from a plurality of vehicles.

Incidentally, the classification itself of the vehicles is not indispensable.

Instruction Processing

The instruction processing is not limited to that exemplified by the processing of S74, S76, S60a, S64. For example, the instruction processing may be processing for instructing to execute an action to make the throttle valve opening degree command value TA* greater than the accelerator operation amount PA or an action to make the retardation amount aop smaller with priority solely for vehicles having the degree of consumption equal to or greater than a predetermined value. Specifically, for example, the policy may be updated such that an action to make the throttle valve opening degree command value TA* smaller than the current greedy action or an action to make the retardation amount aop large is not included in exploration, and the relationship definition data DR after update may be transmitted from the data analysis center 110 to a target vehicle.

For example, when it has been found that an action to make the expected return prominently large is present among the actions other than the current greedy action, the instruction processing may be processing for instructing to execute the found action and a similar action as exploration processing. Here, an action to make the expected return prominently large in a predetermined state should be, for example, an action for which an increase amount of the action value function Q becomes equal to or greater than a predetermined value in a predetermined period. Alternatively, the instruction processing may be specifically processing for updating the policy π such that solely an action for which the absolute value of the difference of the value of the throttle valve opening degree command value TA* with respect to the found action a is equal to or less than a predetermined value and the absolute value of the difference of the retardation amount aop with respect to the found action a is equal to or less than a predetermined value is included in exploration, and transmitting the relationship definition data DR after update from the data analysis center 110 to each vehicle.

Action Variable

In the above-described embodiments, although the throttle valve opening degree command value TA* is exemplified as the variable relating to the opening degree of the throttle valve as the action variable, the disclosure is not limited thereto. For example, the responsiveness of the throttle valve opening degree command value TA* to the accelerator operation amount PA may be expressed by a wasteful time and a second-order lag filter, and three variables in total including the wasteful time and two variables defining the second-order lag filter may be used as the variable relating to the opening degree of the throttle valve. In this case, it is desirable that a state variable is a change amount per unit time of the accelerator operation amount PA instead of the time-series data of the accelerator operation amount PA.

In the above-described embodiments, although the retardation amount aop is exemplified as the variable relating to the ignition timing as the action variable, the disclosure is not limited thereto. For example, the ignition timing itself to be corrected through the KCS may be used.

In the above-described embodiments, although the variable relating to the opening degree of the throttle valve and the variable relating to the ignition timing are exemplified as the action variable, the disclosure is not limited thereto. For example, a fuel injection amount may be used in addition to the variable relating to the opening degree of the throttle valve and the variable relating to the ignition timing. In regards to the three values, solely the variable relating to the opening degree of the throttle valve and the fuel injection amount may be employed as the action variable, or solely the variable relating to the ignition timing and the fuel injection amount may be employed. In regards to the three values, solely one value may be employed as the action variable.

As described in a column "Internal Combustion Engine", in a compression ignition type internal combustion engine, a variable relating to an injection amount may be used instead of the variable relating to the opening degree of the throttle valve, and a variable relating to an injection timing may be used instead of the variable relating to the ignition timing. It is desirable that a variable relating to the number of injections in one combustion cycle or a variable relating to a time interval between an end timing of one of two adjacent fuel injections in time series and a start timing of the other fuel injection for one cylinder in one combustion cycle are added in addition to the variable relating to the injection timing.

For example, when the transmission 50 is a stepped transmission, a current value or the like of a solenoid valve that adjusts an engagement state of a clutch by hydraulic pressure may be used as an action variable. Alternatively, for example, as described in the column "Vehicle", when a hybrid vehicle, an electric vehicle, or a fuel cell vehicle is employed as a vehicle, torque or an output of a rotating electric machine may be used as an action variable. For example, when an in-vehicle air-conditioning device including a compressor that rotates with rotational power of a crankshaft of an internal combustion engine is provided, load torque of the compressor may be included in the action variable. When an electric in-vehicle air-conditioning device is provided, the power consumption of the air-conditioning device may be included in the action variable.

State

In the above-described embodiments, although the time-series data of the accelerator operation amount PA is data including the six values sampled at regular intervals, the disclosure is not limited thereto. Data including two or more sampling values at different sampling timings should be used, and in this case, it is more desirable that data including three or more sampling values or data with the regular sampling interval is used.

A state variable relating to the accelerator operation amount is not limited to the time-series data of the accelerator operation amount PA, and for example, as described in the column "Action Variable", the change amount per unit time of the accelerator operation amount PA, or the like may be used.

For example, as described in the column "Action Variable", when the current value of the solenoid valve is the action variable, a rotation speed of the input shaft 52 or a rotation speed of the output shaft 54 of the transmission, and hydraulic pressure that is adjusted by the solenoid valve may be included in the state. Alternatively, as described in the column "Action Variable", when the torque or the output of the rotating electric machine is the action variable, a charging rate or a temperature of the battery may be included in the state. For example, as described in the column "Action Variable", when the load torque of the compressor or the power consumption of the air-conditioning device is included in the action, a temperature in the vehicle cabin may be included in the state.

Dimension Reduction of Data in Table Format

A dimension reduction method of data in a table format is not limited to that illustrated in the above-described embodiments. For example, since the accelerator operation amount PA rarely becomes a maximum value, the action value function Q is not defined on a state for which the accelerator operation amount PA becomes equal to or greater than a specified amount, and the throttle valve opening degree command value TA* and the like when the accelerator operation amount PA becomes equal to or greater than the specified amount may be separately adapted. For example, dimension reduction may be performed by excluding a value with the throttle valve opening degree command value TA* equal to or greater than a specified value from the possible values of the action.

After shipment of the vehicle, expansion of a range of the possible values of the independent variables of the action value function Q for reinforcement learning compared to before shipment is not indispensable. Reinforcement learning itself before shipment is not indispensable. For example, in the internal combustion engines having the same displacement, after the initial value of the action value function Q is set by diverting adaptive data of the vehicle with the action variable already adapted for the state, the vehicle may be shipped and reinforcement learning may be executed initially after shipment.

Relationship Definition Data

In the above-described embodiments, although the action value function Q is a function in a table format, the disclosure is not limited thereto. For example, a function approximator may be used.

For example, the policy $\pi$ may be a probability of taking the action a instead of using the action value function Q, and the policy $\pi$ itself may be updated according to the reward r. This allows, for example, the policy $\pi$ to be implemented using a function approximator having the state s and the action a as the independent variables and the probability of taking the action a as a dependent variable. In this case, parameters that determine the function approximator should be updated according to the reward r.

Operation Processing

For example, as described in the column "Relationship Definition Data", when the action value function is the function approximator, the action a maximizing the action value function Q should be selected by inputting all sets of discrete values on the action to be the independent variable of the function in a table format in the above-described embodiment to the action value function Q along with the state s.

For example, as described in the column "Relationship Definition Data", in a case where the policy $\pi$ is the function approximator having the state s and the action a as the independent variables and the probability of taking the action a as the dependent variable, the action a should be selected based on the probability indicated by the policy #.

Update Mapping

In the processing of S54 to S60, although a case where the $\varepsilon$-soft on-policy type Monte Carlo method is used is exemplified, the disclosure is not limited thereto. For example, an off-policy Monte Carlo method may be used. Of course, the disclosure is not limited to the Monte Carlo method, for example, an off-policy type TD method may be used, an on-policy type TD method, such as a SARSA method may be used, or eligibility trace method may be used as on-policy type learning.

For example, as described in the column "Relationship Definition Data", when the policy $\pi$ is expressed using the function approximator, and the policy $\pi$ is updated directly based on the reward r, update mapping may be configured using a policy gradient method or the like.

A target to be directly updated based on the reward r is not limited to any one of the action value function Q and the policy $\pi$. For example, like an actor-critic method, the action value function Q and the policy $\pi$ may be updated. In the actor-critic method, the target to be updated is not limited thereto, and for example, a value function V may be a target to be updated instead of the action value function Q.

Reward Calculation Processing

In the processing of FIG. 3, although the reward is provided according to whether or not the logical product of the condition (A) and the condition (B) is true, the disclosure is not limited thereto. For example, processing for providing a reward according to whether or not the condition (A) is satisfied and processing for providing a reward according to whether or not the condition (B) is satisfied may be executed. For example, in regards to the two kinds of processing of the processing for providing the reward according to whether or not the condition (A) is satisfied and the processing for providing the reward according to whether or not the condition (B) is satisfied, solely any one kind processing may be executed.

For example, instead of providing the same reward uniformly when the condition (A) is satisfied, processing for providing a greater reward when an absolute value of the difference between the torque Trq and the torque command value Trq* is small than when the absolute value is large may be applied. For example, instead of providing the same reward uniformly when the condition (A) is not satisfied, processing for providing a smaller reward when the absolute value of the difference between the torque Trq and the torque command value Trq* is large than when the absolute value is small may be applied.

For example, instead of providing the same reward uniformly when the condition (B) is satisfied, processing for making the magnitude of the reward variable according to the magnitude of the acceleration Gx may be applied. For example, instead of providing the same reward uniformly when the condition (B) is not satisfied, processing for making the magnitude of the reward variable according to the magnitude of the acceleration Gx may be applied.

In the above-described embodiment, although the reward r is provided according to whether or not a criterion relating to drivability is satisfied, the criterion relating to drivability is not limited to that described above, and may be set according to whether or not noise or vibration strength satisfies a criterion. Of course, the disclosure is not limited thereto, and for example, any one of four conditions of whether or not the acceleration satisfies a criterion, whether or not the followability of the torque Trq satisfies a criterion, whether or not noise satisfies a criterion, and whether or not vibration strength satisfies a criterion may be applied.

The reward calculation processing is not limited to providing the reward r according to whether the criterion relating to drivability is satisfied. For example, processing for providing a greater reward when a fuel consumption rate satisfies a criterion than when the fuel consumption rate does not satisfy the criterion may be applied. Alternatively, processing for providing a greater reward when an exhaust characteristic satisfies a criterion than when the exhaust characteristic does not satisfy the criterion may be applied. Note that two or three of three kinds of processing of the processing for providing a greater reward when the criterion relating to drivability satisfies the criterion than when the criterion relating to drivability does not satisfy the criterion, the processing for providing a greater reward when the fuel consumption rate satisfies the criterion than when the fuel consumption rate does not satisfy the criterion, and the processing for providing a greater reward when the exhaust characteristic satisfies the criterion than when the exhaust characteristic does not satisfy the criterion may be included.

For example, as described in the column "Action Variable", when the current value of the solenoid valve of the transmission 50 is the action variable, for example, at least one of the following three kinds of processing (a) to (c) may be included in the reward calculation processing.

(a) Processing for providing a greater reward when a time needed for switching a gear ratio in the transmission is within a predetermined time than when the time exceeds the predetermined time (b) Processing for providing a greater reward when an absolute value of a change rate of the rotation speed of the input shaft 52 of the transmission is equal to or less than an input-side predetermined value than when the absolute value exceeds the input-side predetermined value.

(c) Processing for providing a greater reward when an absolute value of a change rate of the rotation speed of the output shaft 54 of the transmission is equal to or less than an output-side predetermined value than when the absolute value exceeds the output-side predetermined value For example, as described in the column "Action Variable", when the torque or the output of the rotating electric machine is the action variable, processing for providing a greater reward when the charging rate of the battery is within a predetermined range than when the charging rate of the battery is out of the predetermined range or processing for providing a greater reward when the temperature of the battery is within a predetermined range than when the temperature of the battery is out of the predetermined range may be included. For example, as described in the column "Action Variable", when the load torque of the compressor or the power consumption of the air-conditioning device is included in the action variable, processing for providing a greater reward when the temperature in the vehicle cabin is within a predetermined range than when the temperature in the vehicle cabin is out of the predetermined range may be added.

Vehicle Control System

The vehicle control system is not limited to the vehicle control system constituted of the control device 70 and the data analysis center 110. For example, the vehicle control system may be constituted of the control device 70, a portable terminal, and the data analysis center 110. This can be implemented by the portable terminal executing the processing of S12.

Processor

The processor is not limited to the processor that includes the CPU 72 (112) and the ROM 74 (114), and executes software processing. For example, a dedicated hardware circuit, such as an ASIC, in which at least a part of the processing executed by the software in the above-described embodiments is executed by hardware, may be provided. That is, the processor should have a configuration of any one of (a) to (c) described below. (a) A processing device that executes the entire processing in compliance with a program, and a program storage device that stores the program, such as a ROM, are provided. (b) A processing device that executes a part of the processing in compliance with a program, a program storage device, and a dedicated hardware circuit that executes the remaining processing are provided. (c) A dedicated hardware circuit that executes the entire processing is provided. Here, a plurality of software processors including the processing device and the program storage device or a plurality of dedicated hardware circuits may be provided.

Memory

In the above-described embodiments, although the memory that stores the relationship definition data DR and the memory (ROM 74) that stores the subprogram 74b for learning or the control program 74a are separate memories, the disclosure is not limited thereto. Although the memory that stores the relationship definition data DR and the memory (ROM 114) that stores the main program 114a for learning are separate memories, the disclosure is not limited thereto.

Internal Combustion Engine

The internal combustion engine is not limited to an internal combustion engine including a port injection valve configured to inject fuel to the intake passage 12 as the fuel injection valve, and may be an internal combustion engine including an in-cylinder injection valve configured to inject fuel directly to the combustion chamber 24 or may be, for example, an internal combustion engine including both of a port injection valve and an in-cylinder injection valve.

The internal combustion engine is not limited to a spark ignition type internal combustion engine, and may be, for example, a compression ignition type internal combustion engine or the like using diesel oil or the like as fuel.

Vehicle

The vehicle is not limited to a vehicle in which a thrust generation device is solely an internal combustion engine, and may be, for example, a so-called hybrid vehicle that includes an internal combustion engine and a rotating electric machine. The vehicle may be a so-called electric vehicle or a fuel cell vehicle that does not include an internal combustion engine and includes a rotating electric machine as a thrust generation device.

What is claimed is:

1. A vehicle control system comprising:
   a memory configured to store relationship definition data that defines a relationship between a state of a vehicle and an action variable, which is a variable relating to an operation of electronic equipment in the vehicle;
   a first processor mounted in the vehicle; and
   a second processor different from an in-vehicle device, wherein:
   the first processor and the second processor are configured to execute
   acquisition processing for acquiring a detection value of a sensor configured to detect the state of the vehicle,
   operation processing for operating the electronic equipment,
   reward calculation processing for providing, based on the detection value acquired through the acquisition processing, a greater reward when a characteristic of the vehicle satisfies a criterion than when the characteristic of the vehicle does not satisfy the criterion, and
   update processing for updating the relationship definition data with the state of the vehicle, a value of the action variable used for the operation of the electronic equipment, and the reward corresponding to the operation based on the detection value acquired through the acquisition processing as inputs to update mapping determined in advance;

the first processor is configured to execute at least the acquisition processing and the operation processing;

the second processor is configured to execute the update processing;

the operation processing includes processing for operating the electronic equipment according to the relationship definition data updated through the update processing and the state of the vehicle;

the second processor is configured to, based on the update mapping, output the relationship definition data updated to increase an expected return on the reward when the electronic equipment is operated in compliance with the relationship definition data;

a plurality of the vehicles is provided, and the update processing has the states of the vehicles, the values of the action variables of the vehicles, and the rewards of the vehicles as inputs to the update mapping;

the operation processing includes exploration processing for executing an operation different from an operation to maximize the expected return ascertained from the relationship definition data; and the second processor is configured to execute instruction processing for issuing different values between a first vehicle and a second vehicle, which are two vehicles among the vehicles, as the value of the action variable to be executed as the exploration processing.

2. The vehicle control system according to claim 1, wherein:

the update processing includes processing for each of a plurality of groups, into which vehicles are classified, for updating the relationship definition data belonging to the same group to update the relationship definition data with the states of a plurality of vehicles belonging to the same group among the vehicles, the values of the action variables of the vehicles belonging to the same group, and the rewards of the vehicles belonging to the same group as inputs to the update mapping; and the second processor is configured to execute specification processing for specifying to which of the groups the states of the vehicles, the values of the action variables of the vehicles, and the rewards of the vehicles belong.

3. The vehicle control system according to claim 2, wherein the specification processing includes processing for specifying a belonging group according to positions of the vehicles.

4. The vehicle control system according to claim 3, wherein the specification processing includes processing for specifying a belonging group according to degrees of consumption of the vehicles.

5. The vehicle control system according to claim 2, wherein the specification processing includes processing for specifying a belonging group according to degrees of consumption of the vehicles.

6. The vehicle control system according to claim 1, wherein the second processor is configured to execute instruction processing for issuing different values between the first vehicle, the second vehicle, and a third vehicle, which are three vehicles among the vehicles, as the value of the action variable to be executed as the exploration processing.

7. The vehicle control system according to claim 1, wherein the exploration processing is executed when a consumption value of at least one of the first vehicle and the second vehicle is equal to or greater than a consumption lower limit value, and the exploration processing is not executed when the consumption value of the at least one of the first vehicle and the second vehicle is not equal to or greater than the consumption lower limit value.

8. The vehicle control system according to claim 7, wherein the consumption lower limit value is set to a value at which a probability, that an action other than the operation different from the operation to maximize the expected return is selected, is assumed to be zero.

9. The vehicle control system according to claim 7, wherein the consumption value is a travelling distance.

10. The vehicle control system according to claim 1, wherein the exploration processing is a second exploration processing that is executed after a first exploration processing, the first exploration processing is executed after shipment of the first vehicle and the second vehicle, and the second exploration processing is executed a predetermined amount of time after the first exploration processing.

11. A vehicle control device comprising:

a memory configured to store relationship definition data that defines a relationship between a state of a vehicle and an action variable, which is a variable relating to an operation of electronic equipment in the vehicle;

a first processor mounted in the vehicle; and a second processor different from an in-vehicle device, wherein:

the first processor and the second processor are configured to execute acquisition processing for acquiring a detection value of a sensor configured to detect the state of the vehicle, operation processing for operating the electronic equipment, reward calculation processing for providing, based on the detection value acquired through the acquisition processing, a greater reward when a characteristic of the vehicle satisfies a criterion than when the characteristic of the vehicle does not satisfy the criterion, and update processing for updating the relationship definition data with the state of the vehicle, a value of the action variable used for the operation of the electronic equipment, and the reward corresponding to the operation based on the detection value acquired through the acquisition processing as inputs to update mapping determined in advance;

the first processor is configured to execute at least the acquisition processing and the operation processing;

the second processor is configured to execute the update processing;

the operation processing includes processing for operating the electronic equipment according to the relationship definition data updated through the update processing and the state of the vehicle;

the second processor is configured to, based on the update mapping, output the relationship definition data updated to increase an expected return on the reward when the electronic equipment is operated in compliance with the relationship definition data;
a plurality of the vehicles is provided, and the update processing has the states of the vehicles, the values of the action variables of the vehicles, and the rewards of the vehicles as inputs to the update mapping;
the operation processing includes exploration processing for executing an operation different from an operation to maximize the expected return ascertained from the relationship definition data; and
the second processor is configured to execute instruction processing for issuing different values between a first vehicle and a second vehicle, which are two vehicles among the vehicles, as the value of the action variable to be executed as the exploration processing.

12. The vehicle control device according to claim 11, wherein:
the update processing includes processing for each of a plurality of groups, into which vehicles are classified, for updating the relationship definition data belonging to the same group to update the relationship definition data with the states of a plurality of vehicles belonging to the same group among the vehicles, the values of the action variables of the vehicles belonging to the same group, and the rewards of the vehicles belonging to the same group as inputs to the update mapping; and
the second processor is configured to execute specification processing for specifying to which of the groups the states of the vehicles, the values of the action variables of the vehicles, and the rewards of the vehicles belong.

13. The vehicle control device according to claim 12, wherein the specification processing includes processing for specifying a belonging group according to positions of the vehicles.

14. The vehicle control device according to claim 13, wherein the specification processing includes processing for specifying a belonging group according to degrees of consumption of the vehicles.

15. The vehicle control device according to claim 12, wherein the specification processing includes processing for specifying a belonging group according to degrees of consumption of the vehicles.

16. A control method for a vehicle including a memory configured to store relationship definition data that defines a relationship between a state of a vehicle and an action variable, which is a variable relating to an operation of electronic equipment in the vehicle, a first processor mounted in the vehicle and a second processor different from an in-vehicle device, the control method comprising:
acquisition processing for acquiring by the first processor and the second processor, a detection value of a sensor configured to detect the state of the vehicle,
operation processing for operating by the first processor and the second processor, the electronic equipment,
reward calculation processing for providing by the first processor and the second processor, based on the detection value acquired through the acquisition processing, a greater reward when a characteristic of the vehicle satisfies a criterion than when the characteristic of the vehicle does not satisfy the criterion, and
update processing for updating by the first processor and the second processor, the relationship definition data with the state of the vehicle, a value of the action variable used for the operation of the electronic equipment, and the reward corresponding to the operation based on the detection value acquired through the acquisition processing as inputs to update mapping determined in advance, wherein
the first processor is configured to execute at least the acquisition processing and the operation processing;
the second processor is configured to execute the update processing;
the operation processing includes processing for operating the electronic equipment according to the relationship definition data updated through the update processing and the state of the vehicle;
the second processor is configured to, based on the update mapping, output the relationship definition data updated to increase an expected return on the reward when the electronic equipment is operated in compliance with the relationship definition data;
a plurality of the vehicles is provided, and the update processing has the states of the vehicles, the values of the action variables of the vehicles, and the rewards of the vehicles as inputs to the update mapping;
the operation processing includes exploration processing for executing an operation different from an operation to maximize the expected return ascertained from the relationship definition data; and
the second processor is configured to execute instruction processing for issuing different values between a first vehicle and a second vehicle, which are two vehicles among the vehicles, as the value of the action variable to be executed as the exploration processing.

17. The control method for a vehicle according to claim 16, wherein:
the update processing includes processing for each of a plurality of groups, into which vehicles are classified, for updating the relationship definition data belonging to the same group to update the relationship definition data with the states of a plurality of vehicles belonging to the same group among the vehicles, the values of the action variables of the vehicles belonging to the same group, and the rewards of the vehicles belonging to the same group as inputs to the update mapping; and
the second processor is configured to execute specification processing for specifying to which of the groups the states of the vehicles, the values of the action variables of the vehicles, and the rewards of the vehicles belong.

18. The control method for a vehicle according to claim 17, wherein the specification processing includes processing for specifying a belonging group according to positions of the vehicles.

19. The control method for a vehicle according to claim 18, wherein the specification processing includes processing for specifying a belonging group according to degrees of consumption of the vehicles.

20. The control method for a vehicle according to claim 17, wherein the specification processing includes processing for specifying a belonging group according to degrees of consumption of the vehicles.

* * * * *